(12) United States Patent
Tokuda et al.

(10) Patent No.: US 11,575,192 B2
(45) Date of Patent: Feb. 7, 2023

(54) REAR GLASS

(71) Applicant: NIPPON SHEET GLASS COMPANY, LIMITED, Tokyo (JP)

(72) Inventors: Tatsumi Tokuda, Tokyo (JP); Hideaki Oshima, Tokyo (JP); Kosuke Tanaka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 145 days.

(21) Appl. No.: 16/770,137

(22) PCT Filed: Dec. 6, 2018

(86) PCT No.: PCT/JP2018/044889
§ 371 (c)(1),
(2) Date: Apr. 30, 2021

(87) PCT Pub. No.: WO2019/111996
PCT Pub. Date: Jun. 13, 2019

(65) Prior Publication Data
US 2021/0257712 A1    Aug. 19, 2021

(30) Foreign Application Priority Data

Dec. 6, 2017    (JP) .............................. JP2017-234717

(51) Int. Cl.
*H04B 1/08*    (2006.01)
*H04W 4/48*    (2018.01)
(Continued)

(52) U.S. Cl.
CPC .......... *H01Q 1/1278* (2013.01); *H01Q 23/00* (2013.01); *H04B 1/082* (2013.01); *H05B 3/84* (2013.01)

(58) Field of Classification Search
CPC ...... H01Q 1/1278; H01Q 23/00; H04B 1/082; H04B 14/004; H05B 3/84;
(Continued)

(56) References Cited

U.S. PATENT DOCUMENTS 5,598,170 A * 1/1997 Nakase ................ H01Q 1/1271
343/704
6,121,934 A * 9/2000 Taniguchi ............ H01Q 1/1278
343/704
(Continued)

FOREIGN PATENT DOCUMENTS

EP    3 163 675 A1    3/2017
JP    2000-13121 A    1/2000
(Continued)

OTHER PUBLICATIONS

Japanese Office Action for Japanese Application No. 2019-558273, dated Mar. 29, 2022, with English translation.
(Continued)

*Primary Examiner* — Andrew Wendell
(74) *Attorney, Agent, or Firm* — Birch, Stewart, Kolasch & Birch, LLP

(57) ABSTRACT

A rear glass according to the present invention is a rear glass that is attachable to a resin lift-up back door in a rear of a vehicle, the rear glass including a glass plate, a defogger that is arranged in the vicinity of a center of the glass plate in an up-down direction, and an AM antenna that is arranged upward of the defogger on the glass plate, in which the AM antenna includes a power supply part and an antenna element that extends from the power supply part.

10 Claims, 12 Drawing Sheets

(51) Int. Cl.
*H01Q 1/12* (2006.01)
*H01Q 23/00* (2006.01)
*H05B 3/84* (2006.01)

(58) Field of Classification Search
CPC ...... H05B 2203/008; B60J 1/00; B60R 11/02; B60S 1/02; H04W 4/48
See application file for complete search history.

(56) References Cited

U.S. PATENT DOCUMENTS

| | | | | |
|---|---|---|---|---|
| 6,208,303 | B1 * | 3/2001 | Tachihara | H01Q 1/1271 343/704 |
| 6,215,450 | B1 * | 4/2001 | Oka | H01Q 1/1271 343/704 |
| 7,227,503 | B2 * | 6/2007 | Baba | H01Q 1/1278 343/711 |
| 8,586,894 | B2 * | 11/2013 | Igura | H05B 3/84 219/202 |
| 10,985,438 | B2 * | 4/2021 | Morishita | H01Q 21/28 |
| 2007/0247379 | A1 * | 10/2007 | Oshima | H01Q 1/1278 343/711 |
| 2007/0273597 | A1 | 11/2007 | Noda | |
| 2008/0169990 | A1 * | 7/2008 | Taniguchi | H01Q 1/1278 343/713 |
| 2011/0032163 | A1 | 2/2011 | Noguchi et al. | |
| 2012/0249382 | A1 * | 10/2012 | Tadokoro | H01Q 5/40 343/713 |
| 2017/0279182 | A1 | 9/2017 | Hayashi et al. | |
| 2019/0190117 | A1 * | 6/2019 | Morishita | H01Q 5/392 |
| 2021/0249754 | A1 * | 8/2021 | Tokuda | H01Q 21/30 |

FOREIGN PATENT DOCUMENTS

| | | |
|---|---|---|
| JP | 2008-5474 A | 1/2008 |
| JP | 2009-33687 A | 2/2009 |
| JP | 2010-109958 A | 5/2010 |
| JP | 2015-56716 A | 3/2015 |
| JP | 2016-25604 A | 2/2016 |
| JP | 2017-85552 A | 5/2017 |
| JP | 2017-175290 A | 9/2017 |
| WO | WO 2016/190064 A1 | 12/2016 |

OTHER PUBLICATIONS

International Search Report (PCT/ISA/210) issued in PCT/JP2018/044889 dated Feb. 12, 2019.
Written Opinion (PCT/ISA/237) issued in PCT/JP2018/044889 dated Feb. 12, 2019.

* cited by examiner

REAR GLASS

TECHNICAL FIELD

The present invention relates to a rear glass that is attachable to a resin back door of a rear of a vehicle.

BACKGROUND ART

Some automobiles include a door referred to as a back door mounted thereto. This back door is a lift-up door for closing an opening in a rear of a vehicle, and the door and a rear glass are formed as a single body. Such a back door is disclosed in Patent Literature 1, for example. A defogger for removing fog is mounted on the rear glass of the back door disclosed in Patent Literature 1. Also, an AM antenna is arranged on the rear glass to surround the defogger.

CITATION LIST

Patent Literature

Patent Literature 1: JP 2015-56716A

SUMMARY OF INVENTION

Technical Problem

Incidentally, because the frequency of AM broadcast waves is relatively low, the installation area needs to be wide in order to increase reception sensitivity. However, since the defogger is arranged on the rear glass, the installation area cannot be increased, and the reception sensitivity of the AM antenna cannot be easily improved. In particular, a lift-up back door has a large installation angle with respect to a horizontal direction, and is installed in a state close to a vertical orientation. Thus, the area of the rear glass is reduced, which makes it more difficult to install an antenna.

Also, the inventors of the present invention found that directionality will be problematic especially when reception sensitivity decreases. That is, when reception sensitivity is sufficiently high, reception sensitivity can be obtained at a certain level or more in all directions even if directionality is biased to some extent, and thus occupants of an automobile can listen to AM broadcasting without issues. However, the inventors found that there is a problem that, when sufficient sensitivity cannot be ensured, occupants are sometimes unable to listen to AM broadcasting depending on the orientation of an automobile, due to directionality being biased. Also, the inventors found that, when a driver drives an automobile, the orientation of the automobile changes over time, and thus, in order for occupants to be able to always stably listen to AM broadcasting, the directionality of an AM antenna needs to be as uniform as possible in all directions.

In this manner, there are various issues in arranging an AM antenna on a rear glass on which a defogger is arranged, and there has been demand for improving reception performance with the use of an AM antenna. The present invention has been made to resolve these issues, and an object thereof is to provide a rear glass capable of improving the reception performance of an AM antenna and making the directionality in particular of an AM antenna substantially uniform in all directions.

Solution to Problem

The present invention is a rear glass that is attachable to a resin lift-up back door in a rear of a vehicle, the rear glass including a glass plate, a defogger that is arranged in the vicinity of a center of the glass plate in an up-down direction, and an AM antenna that is arranged upward of the defogger on the glass plate, in which the AM antenna includes a power supply part and an antenna element that extends from the power supply part.

In the above-described rear glass, the glass plate may be installed at an angle of 45 degrees or more with respect to a horizontal direction in a state in which the back door is closed.

In the above-described rear glass, a distance between an uppermost portion of the defogger and an upper edge of the glass plate attached to the back door may be 40 to 100 mm.

In the above-described rear glass, a distance between an upper end of the defogger and the AM antenna may be less than or equal to the maximum width of the AM antenna in the up-down direction.

The above-described rear glass may further include at least one additional antenna for receiving broadcast waves other than the AM broadcast waves.

In the above-described rear glass, the additional antenna may be arranged upward of the defogger.

In the above-described rear glass, the additional antenna may include a main antenna and a sub-antenna, and the AM antenna may be arranged between the main antenna and the sub-antenna in a horizontal direction.

In the above-described rear glass, the additional antenna may be an FM antenna.

In the above-described rear glass, the additional antenna may be a digital television antenna.

The above-described rear glass may further include at least one of a digital television antenna and a DAB antenna that are arranged downward of the defogger on the glass plate.

In the above-described rear glass, an installation area of the AM antenna may be 0.005 to 0.05 $m^2$, and an amplifier that is connected to the AM antenna may have a capacitance of 10 to 30 pF.

Advantageous Effects of Invention

With a rear glass according to the present invention, it is possible to improve the reception performance of an AM antenna and make the directionality in particular of an AM antenna substantially uniform in all directions.

DESCRIPTION OF EMBODIMENTS

Figure 1:
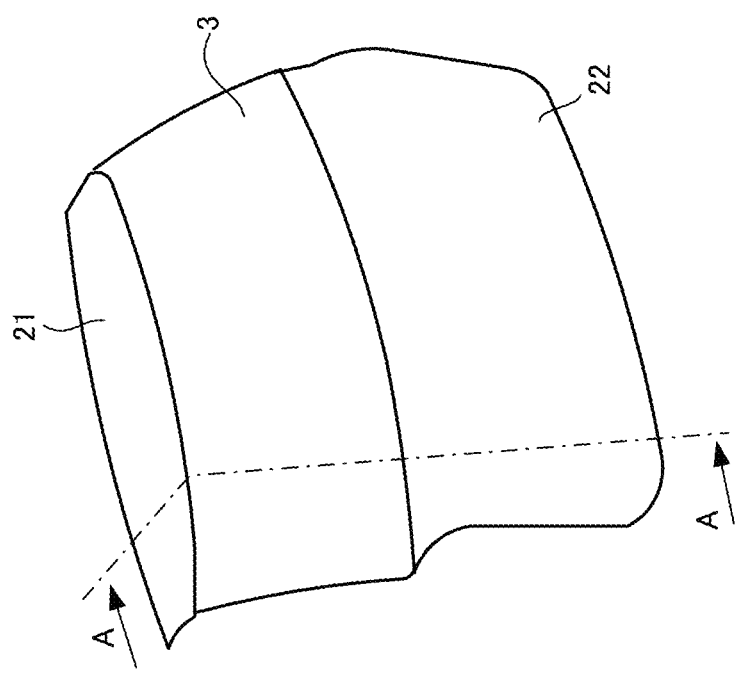
FIG. 1 is a perspective view of a back door according to the present invention.
Figure 2:
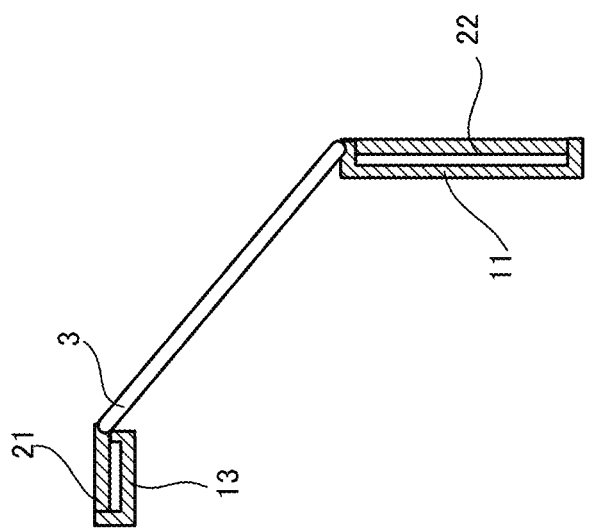
FIG. 2 is a cross-sectional view of the back door taken along line A-A in FIG. 1.
Figure 3:
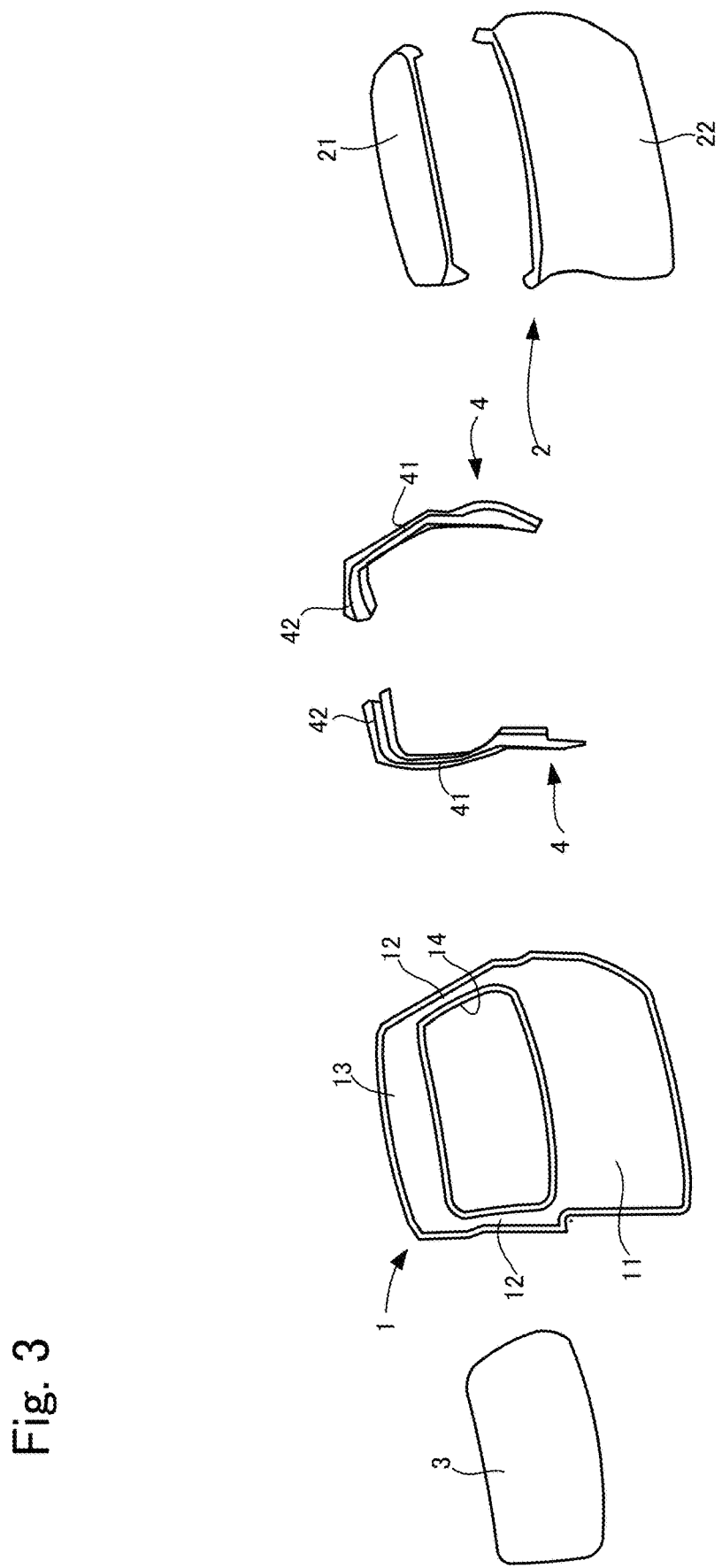
FIG. 3 is an exploded perspective view of the back door shown in FIG. 1.

Hereinafter, an embodiment of a back door attached to a rear glass according to the present invention will be described with reference to the drawings. FIG. 1 is a front view of a back door according to this embodiment, FIG. 2 is a cross-sectional view of the back door taken along line A-A in FIG. 1, and FIG. 3 is an exploded perspective view of the back door shown in FIG. 1. Note that, hereinafter, for convenience of description, for example, the up-down direction in FIG. 1 may be referred to as the up-down direction or the vertical direction, and the left-right direction in FIG. 1 may be referred to as the left-right direction or the horizontal direction, based on the orientations of the drawings. However, these directions are not intended to limit the present invention.

1. Overview of Back Door

As shown in FIG. 1, a back door according to this embodiment is for closing an opening (not shown) formed in the rear of a hatchback vehicle, for example, and is attached to an end portion of a roof panel (not shown) of the vehicle that forms an upper edge of this opening with a hinge (not shown). In other words, the back door constitutes a flip-up door. Specifically, the back door is constituted as follows. Note that, in the following description, when indicating directions of various parts of the back door, unless otherwise specified, the directions in a state where the opening is closed are indicated.

As shown in FIGS. 1 to 3, the back door includes an inner panel 1 arranged on the vehicle inner side, outer panels 21 and 22 that are mounted on the vehicle outer side of the inner panel, a rear glass 3, and a pair of reinforcing frames 4 that are arranged on the upper portion of the inner panel 1.

As shown in FIG. 3, the inner panel 1 is provided with a rectangular main part 11, a pair of side edge parts 12 that are attached to the upper end portion of this main part 11, and an upper edge part 13 that joins the upper ends of the two side edge parts 12, these parts being formed as a single body. The main part 11 is a portion that closes the lower part of the vehicle opening, and is formed to extend substantially in the vertical direction when the vehicle opening is closed. The pair of side edge parts 12 extend obliquely upward from the two sides of the upper edge of the main part 11. In other words, the side edge parts 12 extend obliquely toward the front of the vehicle progressing in an upward direction. Also, since the upper edge part 13 joins the upper ends of the side edge parts 12, a rectangular window opening part 14 is formed by the upper edge of the main part 11, the two side edge parts 12, and the upper edge part 13. Also, the rear glass 3 is mounted to close this window opening part 14.

The outer panel is formed by two members, namely, an upper panel 21 and a lower panel 22. The upper panel 21 is a rectangular member that covers the upper edge part 13 of the inner panel 1. Also, the lower panel 22 is a member that covers the main part 11 of the inner panel 1. Accordingly, the rear glass 3 is mounted between the upper panel 21 and the lower panel 22.

Because the two reinforcing frames 4 are symmetrically shaped, only the left reinforcing frame 4 will be described here. This reinforcing frame 4 is an L-shaped member including a first portion 41 that extends in the up-down direction and a second portion 42 that is joined to the upper end of the first portion 41 and extends horizontally rightward, these portions being formed as a single body. This reinforcing frame 4 is arranged between the inner panel 1 and the outer panels 21 and 22. In other words, the first portion 41 of the reinforcing frame 4 is attached to a region of the inner panel 1 corresponding to the side edge part 12 and the vicinity of the upper end of the main part 11 that is continuous with the side edge part 12. On the other hand, the second portion 42 is attached to a region of the inner panel 1 extending from the left end part to a vicinity of the center of the upper edge part 13. Accordingly, the vicinity of the upper end of the main part 11, the two side edge parts 12, and the upper edge part 13 of the inner panel 1 are reinforced by the two reinforcing frames 4.

The inner panel 1, the upper panel 21, the lower panel 22, and the reinforcing frames 4 are made of a resin material. For example, carbon fiber reinforced plastic (CFRP) may be adopted. Note that, the lower panel 22 contributes little to the rigidity of the back door, and thus can be made of a resin material such as polypropylene.

Note that, the attachment angle of the rear glass 3 that is fitted in the above-described opening part is not particularly limited, and the rear glass 3 is preferably attached at an angle of 45 degrees or more with respect to the horizontal direction, for example, and is particularly preferably attached at an angle of 45 degrees to 70 degrees.

2. Overview of Rear Glass

Figure 4:
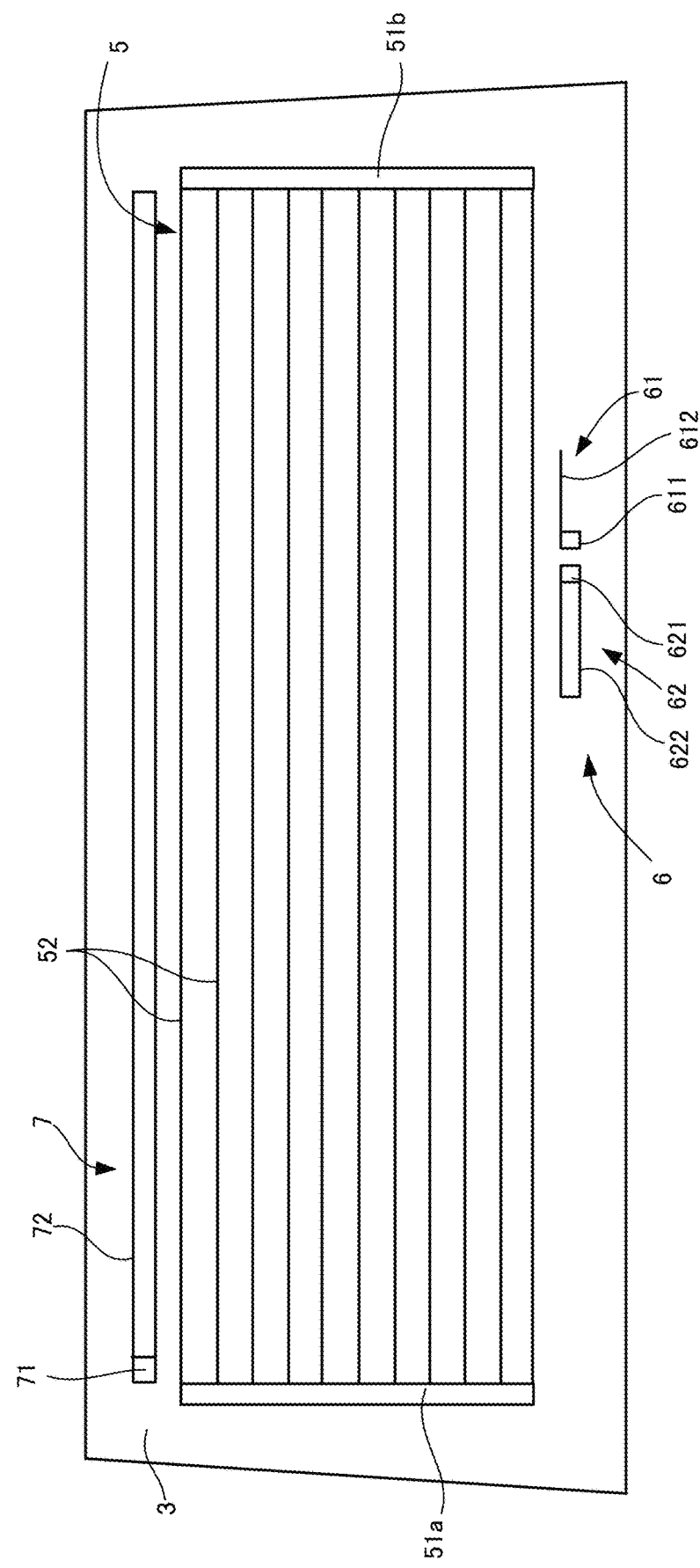
FIG. 4 is a front view of a rear glass of the back door shown in FIG. 1.

Next, the rear glass 3 will be described with reference to FIG. 4. FIG. 4 is a front view of the rear glass. As shown in FIG. 4, the rear glass 3 is shaped like a rectangle, and is fixed between the upper panel 21 and the lower panel 22 that are arranged in the up-down direction, to the inner panel 1 and the reinforcing frame 4 with a fastening member (not shown) or the like. A defogger 5, a digital television (DTV) antenna 6, and an AM antenna 7 are mounted on the rear glass 3. Hereinafter, the members will be described in order.

2-1. Glass Plate

A well-known glass plate for automobiles can be utilized for the rear glass 3. For example, heat absorbing glass, common clear glass, common green glass or UV green glass may be utilized as the glass plate. Such a glass plate needs, however, to realize a visible light transmittance with safety standards of the country in which the automobile will be used. For example, solar absorptivity, visible light transmittance and the like can be adjusted to meet safety standards. Hereinafter, an example of the composition of clear glass and an example of the composition of heat absorbing glass will be shown.

Clear Glass $SiO_2$: 70 to 73 mass %
$Al_2O_3$: 0.6 to 2.4 mass %
CaO: 7 to 12 mass %
MgO: 1.0 to 4.5 mass %
$R^2O$: 13 to 15 mass % (R represents an alkaline metal)
Total iron oxide in terms of $Fe_2O_3$ (T-$Fe_2O_3$): 0.08 to 0.14 mass %

Heat Absorbing Glass

The composition of heat absorbing glass can, for example, be given as a composition, based on the composition of clear glass, including total iron oxide in terms of $Fe_2O_3$ (T-$Fe_2O_3$) at a ratio of 0.4 to 1.3 mass %, $CeO_2$ at a ratio of 0 to 2 mass %, and $TiO_2$ at a ratio of 0 to 0.5 mass %, and in which the skeletal component (mainly $SiO_2$ or $Al_2O_3$) of the glass is reduced by an amount equivalent to the increase in T-$Fe_2O_3$, $CeO_2$ and $TiO_2$.

Note that the type of glass plate is not limited to clear glass or heat absorbing glass, and is selectable as appropriate according to the embodiment. For example, the glass plate may be a resin window made of acrylic resin, polycarbonate resin or the like.

Also, the rear glass 3 is formed so as to curve appropriately along the shape of the inner panel 1. Also, such a rear glass 3, apart from being constituted by a single glass plate, may be a laminated glass in which an intermediate film such as a resin film is sandwiched by a plurality of plates of glass.

There is no particular limitation on the length of a portion of the back door to which the rear glass 3 is attached, the portion extending from an upper body flange (a part that is in contact with the upper side of the rear glass 3) to a lower body flange (a part that is in contact with the lower side of the rear glass 3), that is, the length of the rear glass 3 in the up-down direction, and for example, the length thereof may be set to about 300 mm to 500 mm.

2-2. Defogger

Next, the defogger 5 will be described. As shown in FIG. 4, the defogger 5 is arranged in the vicinity of the center of the rear glass 3 in the up-down direction, and is formed so as to extend across the entirety of the rear glass 3 in the left-right direction. Specifically, this defogger 5 includes a pair of bus bars 51a and 51b for power supply that respectively extend in the up-down direction along the two side edges of the rear glass 3. Between the two bus bars 51a and 51b, a plurality of heating wires 52 extending in the horizontal direction are disposed in parallel at a predetermined interval, and heat for defogging is produced by power supply from the bus bars 51a and 51b. Note that the defogger 5 may also be provided with at least one vertical line that intersects a plurality of heating wires 52 and extend in the up-down direction.

Also, the length of the defogger 5 in the up-down direction is not particularly limited, and may be set to 200 mm to 400 mm, for example. Also, the length of the defogger 5 in the up-down direction may be set to 65% to 85% of the length of the rear glass 3 in the up-down direction. Also, the distance between the upper body flange and the uppermost portion of the defogger 5 (the heating wire 52 arranged at the uppermost position) may be set to 40 mm to 100 mm, for example.

2-3. DTV Antenna

Next, the DTV antenna (Digital Television Antenna) 6 will be described. As shown in FIG. 4, the DTV antenna 6 is arranged downward of the defogger 5, and formed by a core wire-side element (conductive linear element) 61 and a ground-side element (conductive linear element) 62. The core wire-side element 61 includes a rectangular core wire-side power supply part 611 arranged downward of the defogger 5, and a horizontal part 612 extending rightward from this power supply part 611. On the other hand, the ground-side element 62 is provided with a rectangular ground-side power supply part 621 arranged on the left side of the core wire-side power supply part 611, and a ground main body 622 connected to this power supply part 621. The ground main body 622 is formed by an upper horizontal part extending leftward from the upper end of the ground-side power supply part 621, a vertical part extending downward from the left end of this upper horizontal part, and a second horizontal part that extends rightward from the lower end of this vertical part and is connected to the lower end of the ground-side power supply part 621.

Furthermore, the automobile is provided with a digital television receiver (not shown) and an amplifier (not shown) connected thereto, and the core wire-side power supply part 611 is connected to an inner conductor of a coaxial cable (not shown) connected to the amplifier. On the other hand, the ground-side power supply part 621 is electrically connected to an outer conductor of the coaxial cable.

2-4. AM Antenna

Next, the AM antenna 7 will be described. The AM antenna 7 is arranged upward of the defogger 5, and includes a power supply part 71 arranged on the left side of the glass plate 3, and an antenna element 72 extending from the power supply part 71. The antenna element 72 is formed in a linear shape, and is arranged to surround a rectangular region whose longitudinal direction is the horizontal direction. Also, the power supply part 71 is arranged on the left side of the antenna element 72.

The installation area of the AM antenna 7 is not particularly limited, and is preferably 0.005 to 0.05 $m^2$, and more preferably 0.01 to 0.03 $m^2$, for example. The rear glass 3 is installed on the back door at an angle that is relatively close to the vertical direction, and thus the length thereof in the up-down direction is relatively short. Thus, the installation area of the AM antenna 7 is small as described above. Note that the installation area refers to the area surrounded by a portion that forms the outermost edge of the power supply part 71 and the antenna element 72. In this embodiment, the installation area refers to the area of a rectangular region surrounded by the power supply part 71 and the antenna element 72, for example.

Also, because noise may be present in AM broadcast waves when the distance between the defogger 5 and the AM antenna 7 is short, the distance between the uppermost portion of the defogger 5 and the lowermost portion of the AM antenna 7 is preferably 20 mm or more, and more preferably 40 mm or more. Also, the distance between the upper flange and the uppermost portion of the AM antenna 7 is preferably 5 mm or more, and more preferably 10 mm or more.

On the other hand, in order to improve reception sensitivity, the installation area of the AM antenna 7 is preferably wide. In view of this, if the maximum length of the AM antenna 7 in the up-down direction can be increased, the distance between the defogger 5 and the AM antenna 7 can be reduced (e.g., 100 mm or less), although there is some noise influence. In this case, it is preferable that the maximum length of the AM antenna 7 in the up-down direction is longer than the distance between the defogger 5 and the AM antenna 7, for example.

Also, an AM antenna receiver (not shown) and an amplifier (not shown) connected thereto are connected to the power supply part 71 of the AM antenna 7. The capacitance of the amplifier is not particularly limited, and is preferably set to 30 pF or less, and is more preferably set to 5 to 25 pF, for example. This is because, the smaller the capacity of the amplifier is, the higher the reception voltage is, that is, reception sensitivity increases. However, the capacity of the amplifier is restricted by an electric line located on the opposite side of the amplifier with respect to the AM antenna 7 due to the capacity of the amplifier also influencing the electric line. Thus, it is preferable to use an amplifier with a capacitance of 5 pF or more.

2-5. Material

The defogger 5, the DTV antenna 6, and the AM antenna 7 such as described above are formed by combining wire materials, and these members can be formed by laminating a conductive material having conductivity on the surface of the rear glass 3, such that a predetermined pattern is formed. Any conductive material can be adopted as such a material, and can be selected as appropriate according to the embodiment, with silver, gold, platinum and the like given as examples. Specifically, these members can be formed by, for example, printing and baking a conductive silver paste containing silver powder, glass frit and the like on the surface of the rear glass 3.

3. Features

As described above, according to this embodiment, the following effects can be achieved.

(1) Since the back door is made of a resin material, rather than a metal that may interfere with the reception of radio waves, it is possible to further improve the radio wave reception sensitivity of the AM antenna 7 and the DTV antenna 6.

(2) Because lift-up back doors are likely to be installed at an angle of 45 degrees or more with respect to the horizontal direction as described above and are substantially in an upright state, fog needs to be removed from up to an upper portion of the rear glass in order to secure visibility. Thus, the defogger 5 needs to be spread upward, and accordingly, an upper region of the defogger 5 is likely to be narrow. On the other hand, in order to obtain good reception sensitivity, the AM antenna 7 needs to have a large installation area due to the AM antenna 7 receiving radio waves in a low frequency band. Thus, if an AM antenna is provided on such a back door, it is conceivable as appropriate that the AM antenna is provided in a downward region of the defogger 5. In contrast, priority is given to improvement of the directionality of the AM antenna 7 in this embodiment, and thus the inventors of the present invention found that, as will be described later, the directionality of the AM antenna 7 can be improved by arranging the AM antenna 7 upward of the defogger 5. That is, as in this embodiment, variation in reception sensitivity according to the direction of a vehicle can be reduced by arranging the AM antenna 7 upward of the defogger 5.

(3) The inventors of the present invention found that reception sensitivity can be improved by reducing the amplifier capacity for the AM antenna 7. As described above, even if the installation area of the AM antenna 7 is small, reception sensitivity can be improved by reducing the amplifier capacitance to 30 pF or less, for example.

(4) The rear glass 3 inclines rearward progressing in a downward direction, and thus no metal is arranged rearward of the defogger 5. Thus, because the above-described DTV antenna 6 is arranged downward of the defogger 5, a metal, in other words, a material that interferes with the reception of radio waves, is not arranged rearward of the DTV antenna 6. Accordingly, it is possible to facilitate the reception of radio waves from behind the vehicle, and improve the reception sensitivity. In particular, the DTV antenna 6 receives a broadcast wave in a higher frequency band than AM broadcast waves and FM broadcast waves, and is thus likely to be affected by a metal. Accordingly, the configuration as described above is particularly advantageous in improving the reception performance of the DTV antenna 6.

(5) When the defogger 5 is arranged rearward of the DTV antenna 6, the radiation of the antenna is directed upward, and thus the sensitivity in the horizontal direction decreases, and furthermore, the sensitivity is influenced by the attachment angle of the rear glass 3. However, since the defogger 5 is arranged forward of the DTV antenna 6, antenna sensitivity is ensured regardless of the attachment angle of the rear glass 3. For this reason, since DTV antennas having the same shape can be applied to the automobiles having various attachment angles of the rear glass, high versatility is achieved.

4. Variations

Although an embodiment of the present invention has been described above, the present invention is not limited to the above-described embodiment, and various changes can be made without departing from the gist of the invention. Note that the following variations can be combined as appropriate.

4-1

The above-described configuration of the AM antenna 7 is merely an example, and the number, length, shape, direction, and the like of the elements are not particularly limited, and various configurations may be adopted. Also, although the entirety of the AM antenna 7 is arranged upward of the defogger 5 in the above-described embodiment, the entirety of the AM antenna 7 need not be arranged upward of the defogger 5, and 50% or more, preferably 70% or more, and more preferably 90% or more of the installation area of the AM antenna 7 need only be arranged upward of the defogger 5, for example. Thus, a portion of the AM antenna 7 may be arranged on a side or downward of the defogger 5. It is possible to install a main portion of the AM antenna 7 upward of the defogger 5, and to arrange the other portion on a side or downward of the defogger 5, for example.

4-2

An additional antenna other than the AM antenna 7 may also be arranged upward of the defogger 5. It is possible to arrange at least one of an FM antenna, a DTV antenna, a DAB antenna, and the like, for example. These antennas may be constituted by a single antenna, or may be constituted by a main antenna and sub-antennas, for example. In this case, the AM antennas 7 may be disposed between the main antenna and the sub-antennas in the horizontal direction. This makes it possible to secure the distance between the main antenna and the sub-antennas, and thus to improve reception performance. Also, it is possible to provide an AM/FM dual antenna in which the AM antenna 7 and an FM antenna are formed as a single body.

4-3

The above-described configuration of the DTV antenna 6 is merely an example, and the number, length, shape, direction, and the like of the elements are not particularly limited. Also, in addition to the DTV antenna, a DAB antenna may be arranged downward of the defogger 5. In addition, an FM antenna may be arranged. However, a DTV antenna, a DAB antenna, or an FM antenna is not necessarily provided, as long as at least the above-described AM antenna 7 need only be arranged on the rear glass according to the present invention.

4-4

There is no particular limitation on the configuration of the defogger 5, as long as the bus bars 51a and 51b are arranged on at least two sides of the defogger 5, and a plurality of horizontal heating wires 52 that connect these bus bars 51a and 51b are provided. Also, at least one vertical wire that intersect the horizontal heating wires 52 may be provided.

4-5

The configuration of the back door is not particularly limited, as long as the back door includes a resin panel, and this resin panel forms an opening part into which the rear glass 3 is fitted. Accordingly, the back door may include one resin panel in which the upper panel and the lower panel are formed as a single body, for example, or the back door may include more than two panels.

Furthermore, from the viewpoint of the reception sensitivity of the antenna, it is preferable that all the panels that form the back door are made of a resin material, but at least a part of the panels may be made of metal. For example, it is also possible that the reinforcing frame is made of metal, and at least a part of another panel is made of metal.

4-6

An amplifier may be arranged on the glass plate 3, instead of being provided inside the vehicle. The amplifier may also be omitted, and the power supply part and the receiver may be directly connected to each other.

Working Examples

Hereinafter, working examples of the present invention will be described. The present invention is, however, not limited to the following working examples.

1. Consideration on Position of AM Antenna 1

Figure 5:
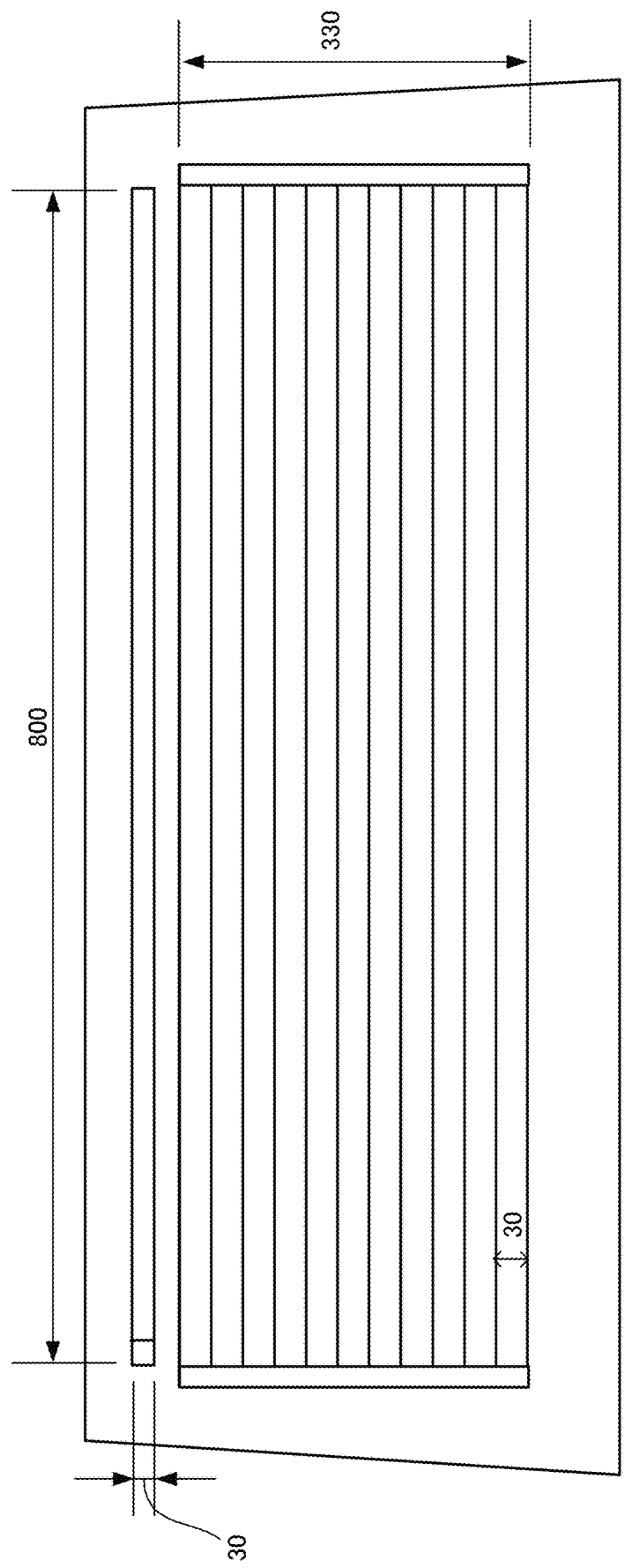
FIG. 5 is a front view of a rear glass according to a working example.
Figure 6:
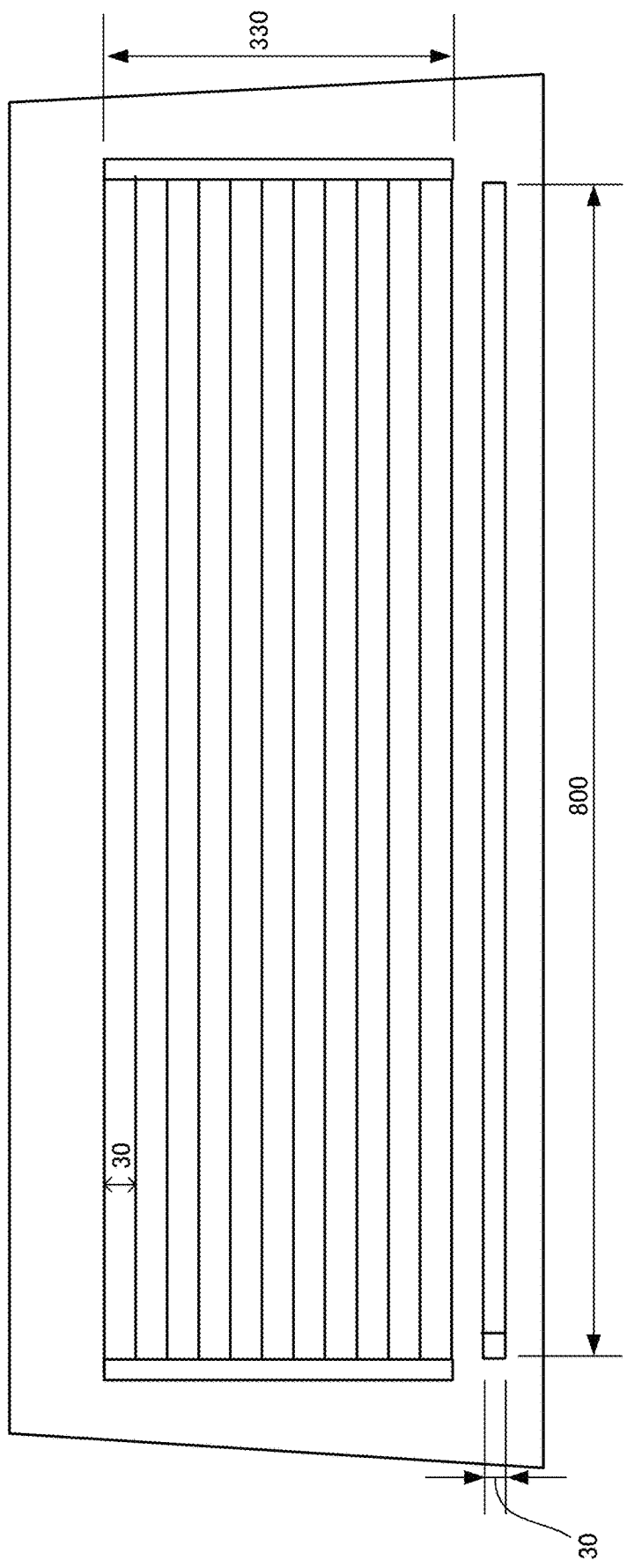
FIG. 6 is a front view of a rear glass according to a comparative example.

Rear glasses having patterns shown in FIGS. 5 and 6 were prepared as Working Example 1 and Comparative Example 1 (units are in mm). As shown in FIG. 5, Working Example 1 corresponds to the above-described embodiment. Comparative Example 1 shown in FIG. 6 is different from Working Example 1 in the position of the AM antenna and the AM antenna is arranged downward of a defogger.

Figure 7:
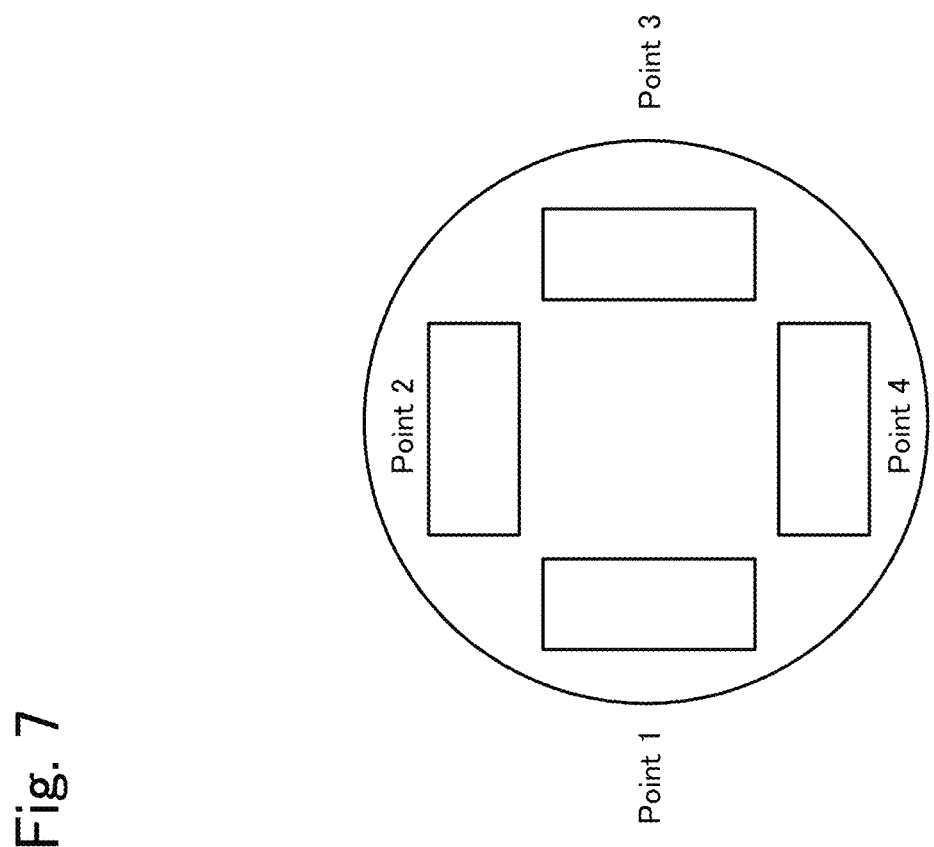
FIG. 7 is a plan view of an AM antenna measurement site of an automobile used in evaluation of working examples and comparative examples.

Then, the rear glasses according to Working Example 1 and Comparative Example 1 as described above were mounted to an automobile having the back door shown in FIGS. 1 and 2, and thereafter the automobile was arranged on an AM antenna measurement site shown in FIG. 7. The AM antenna measurement site have four points at which the orientation of the automobile is changed in four ways. Also, the reception sensitivities at seven frequencies (594, 693, 810, 954, 1134, 1242, and 1458 kHz) of AM broadcast waves having a frequency of 530 to 1710 kHz that are usually broadcast were each measured at the four points on the AM antenna measurement site. That is, the reception voltage (reception sensitivity) was measured at the four points corresponding to every 90 degrees on the AM antenna measurement site.

Figure 8:
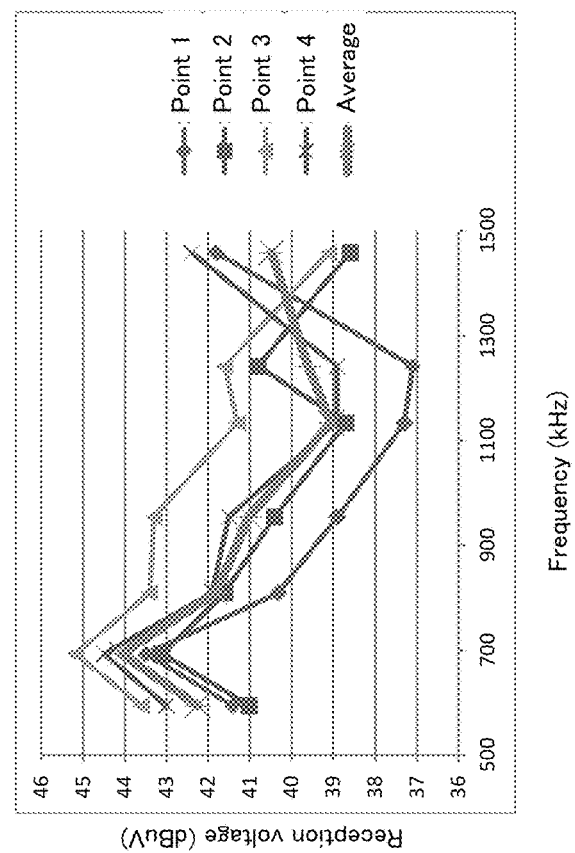
FIG. 8 is a graph showing the reception sensitivity of an AM antenna of a rear glass according to a working example.
Figure 9:
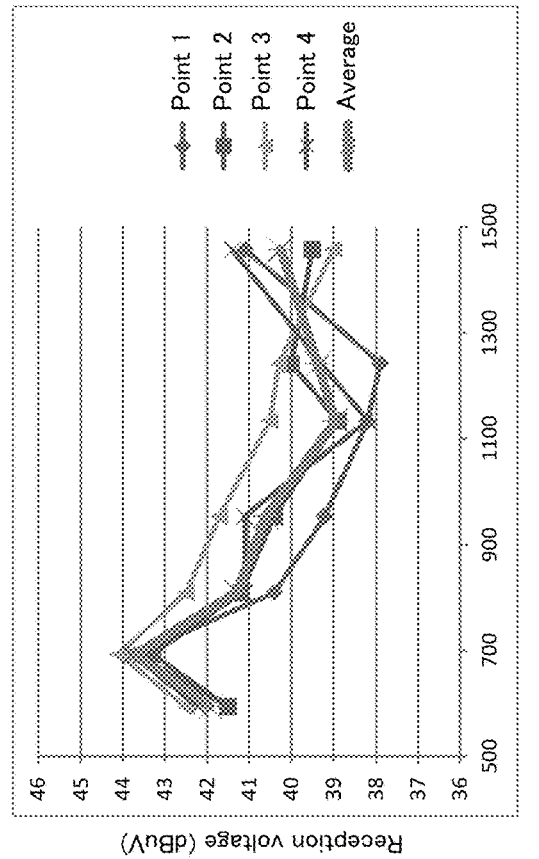
FIG. 9 is a graph showing the reception sensitivity of an AM antenna of a rear glass according to a comparative example.
Figure 10:
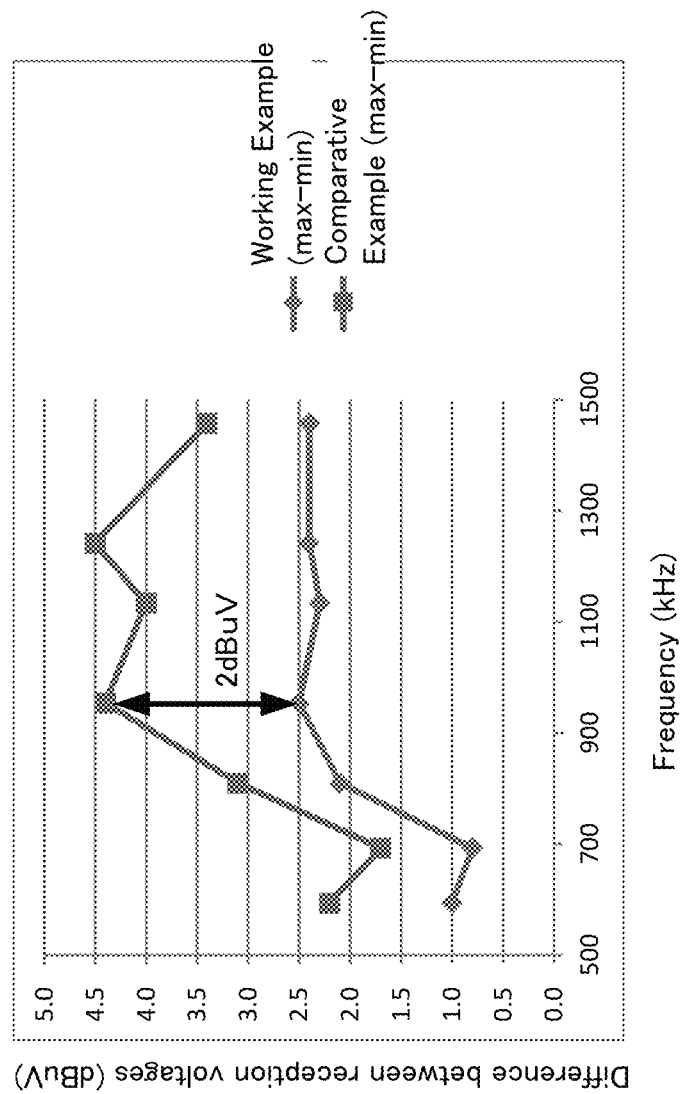
FIG. 10 is a graph showing a difference between the maximum reception sensitivity and the minimum reception sensitivity of AM antennas according to a working example and a comparative example.

The results are shown in FIGS. 8 to 10. FIG. 8 shows the reception voltage (reception sensitivity) of AM broadcast waves at each frequency according to Working Example 1, and FIG. 9 shows the reception voltage (reception sensitivity) of AM broadcast waves at each frequency according to Comparative Example 1. Also, FIG. 10 shows differences between the maximum reception voltage and the minimum reception voltage at the four points for each frequency in Working Example 1 and Comparative Example 1. As shown in FIG. 10, Comparative Example 1 had a larger difference between the maximum reception voltage and the minimum reception voltage was larger in all the frequency bands, compared to Working Example 1. That is, it was found that, Working Example 1 had better directionality than Comparative Example 1, and even if the orientation of the automobile was changed, variation in the reception sensitivity was reduced.

2. Consideration on Position of AM Antenna 2

Figure 11:
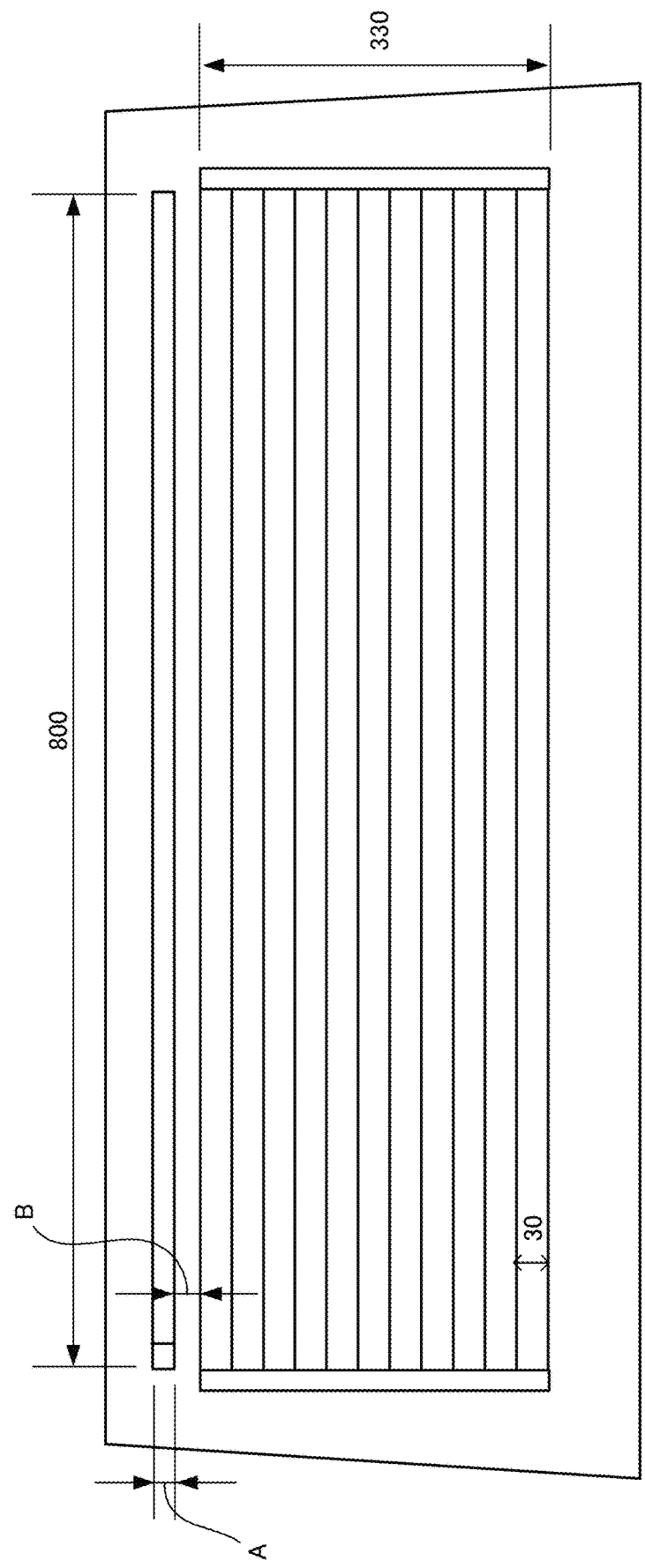
FIG. 11 is a front view showing rear glasses according to Working Examples 2 to 4.

Next, studies were conducted regarding the relationship between the installation area of the AM antenna and the distance between the AM antenna and a defogger. Hereinafter, rear glasses according to Working Examples 2 to 4 were prepared. With Working Examples 2 to 4, the lengths of A and B shown in FIG. 11 were changed as follows. "A" indicates the distance of an AM antenna in the up-down direction, and "B" indicates the distance between the uppermost portion of the defogger and the lowermost portion of the AM antenna.

TABLE 1

|  | A | B | Installation Area (A*800) |
|---|---|---|---|
| Work. Ex. 2 | 20 mm | 40 mm | 0.016 m$^2$ |
| Work. Ex. 3 | 30 mm | 30 mm | 0.024 m$^2$ |
| Work. Ex. 4 | 40 mm | 20 mm | 0.032 m$^2$ |

Figure 12:
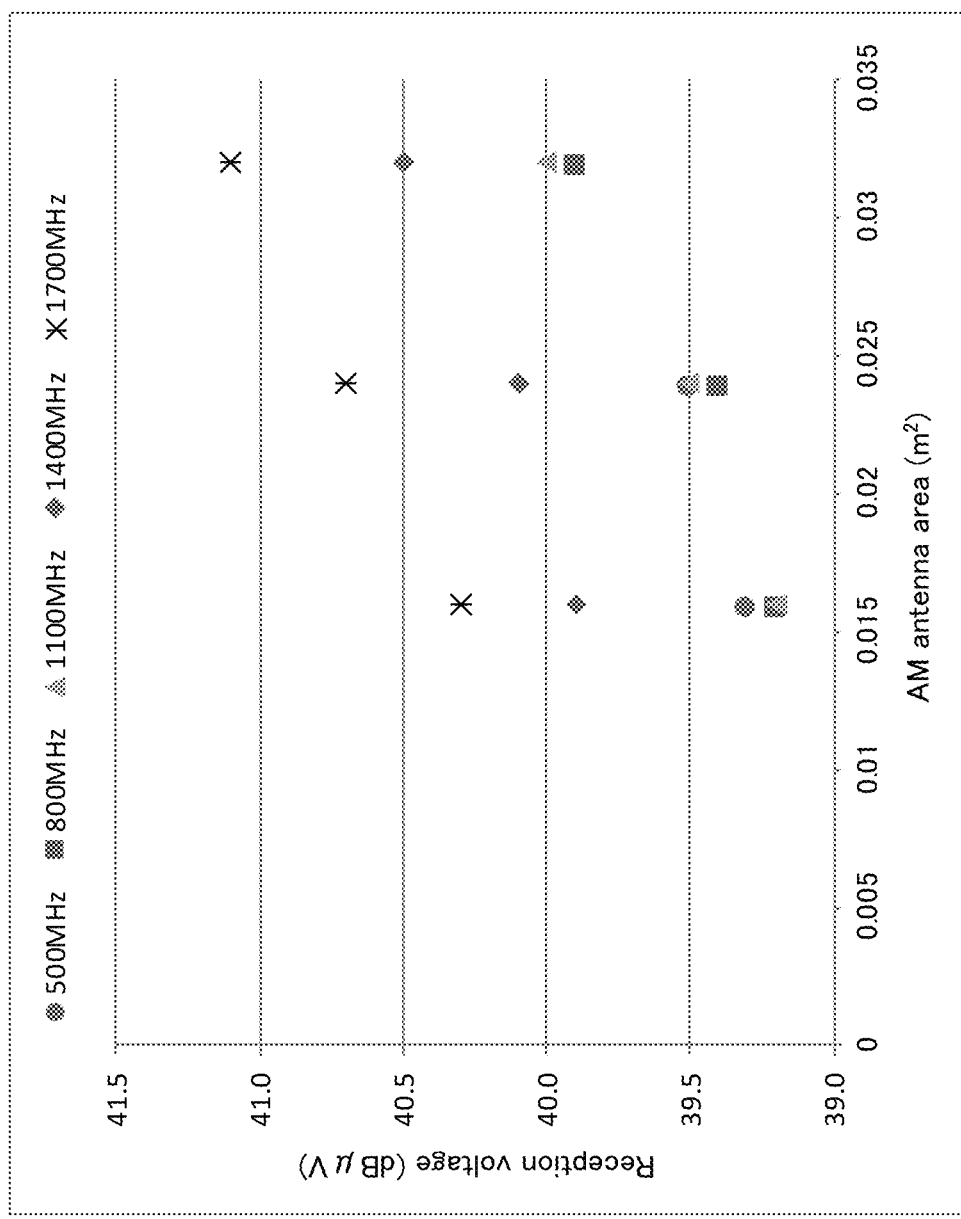
FIG. 12 is a graph showing reception performance in the rear glasses according to Working Examples 2 to 4.

With regard to Working Examples 2 to 4 described above, average reception voltages at the above-described four points at a frequency of 500, 800, 1100, 1400, and 1700 MHz were calculated with the use of a method that was the same as above. The results are shown in FIG. 12. As shown in FIG. 12, it was found that the larger the installation area of the AM antenna is, the higher the reception performance is, even if the distance between the AM antenna and the defogger is short. In particular, it was found that, as with Working Example 4, if the length of the AM antenna in the up-down direction is longer than the distance between the AM antenna and the defogger, the reception performance is higher.

3. Consideration on Position of AM Antenna 3

Figure 13:
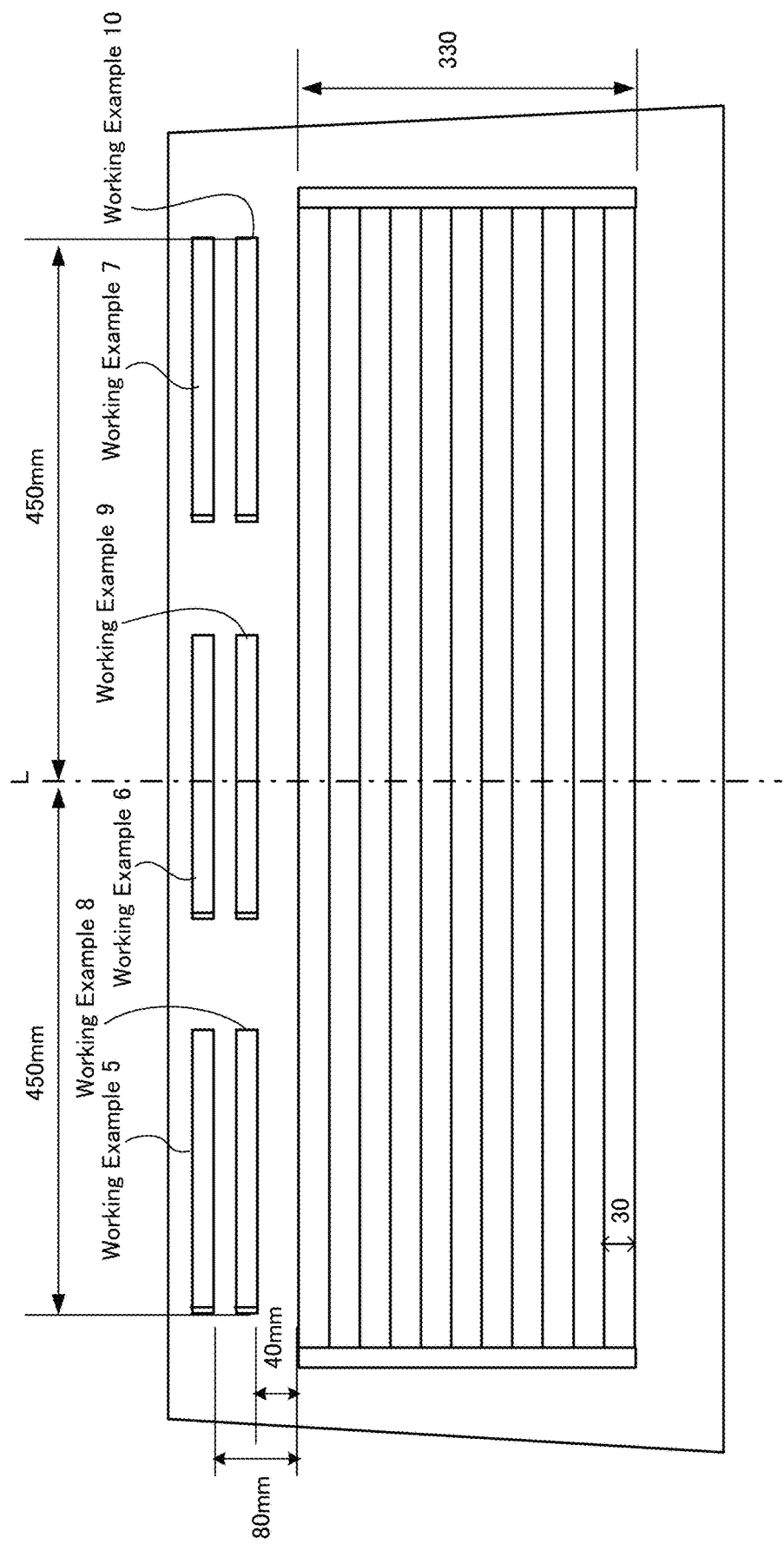
FIG. 13 is a front view showing rear glasses according to Working Examples 5 to 10.

With regard to Working Examples 5 to 10, noise was measured regarding the position of the AM antenna. FIG. 13 shows the positions of the AM antennas according to Working Examples 5 to 10. In Working Examples 6 and 9, the AM antenna was arranged so as to extend symmetrically with respect to a center line L of a rear glass that extends in the horizontal direction. With Working Examples 5 and 8, the AM antenna was arranged to extend toward the center from a position located 450 mm leftward away from the center line L. In a similar manner thereto, with Working Examples 7 and 10, the AM antenna was arranged to extend toward the center from a position located 450 mm rightward away from the center line L. Also, with Working Examples 5 to 7, the AM antenna was arranged at a position located 80 mm away from the defogger, and with Working Examples 8 to 10, the AM antenna was arranged at a position located 40 mm away from the defogger. The length of each AM antenna in the up-down direction was set to 40 mm, the length thereof in the horizontal direction was set to 100 mm in Working Examples 5 to 7, and 80 mm in Working Examples 8 to 10. The reason why the lengths were changed between Working Examples 5 to 7 and Working Examples 8 to 10 was for adjustment to enable reception equivalent to that of the AM antennas.

Also, noise was measured as follows. First, a motor of a rear wiper serving as a noise source was operated in a state in which the position of the automobile to which the rear glass of each of Working Examples 5 to 10 was mounted was fixed. Noise was measured in this state at 550 frequencies at about 2 KHz intervals in the entire AM frequency band (510

KHz to 1710 KHz), and the average of all the measured values was regarded as "noise". The results are as follows.

TABLE 2

|  | Noise |
|---|---|
| Work. Ex. 5 | −75.3 dBm |
| Work. Ex. 6 | −71.0 dBm |
| Work. Ex. 7 | −75.3 dBm |
| Work. Ex. 8 | −71.0 dBm |
| Work. Ex. 9 | −69.7 dBm |
| Work. Ex. 10 | −71.5 dBm |

As shown in Table 2, an AM antenna made less noise when the AM antenna was located away from a defogger. Also, it was found that noise was smaller when the AM antenna was arranged at the right and left end parts, than at the center in the horizontal direction. It is conceivable that this is because noise generated from the inside of the vehicle influenced the AM antennas through the defogger. Also, because the back door was made of a resin material, rather than a metal, even if an AM antenna approaches the upper end of the door, the AM antenna did not interfere with the reception.

Note that, if a DTV antenna is provided as an additional antenna, from the viewpoint of directionality, DTV antennas are preferably arranged at two ends in the horizontal direction. In view of this, in particular, if a DTV antenna and an AM antenna are arranged upward of a defogger, it is preferable that, from the viewpoint of restrictions on the directionality of the DTV antenna, the AM antenna is arranged at a position located away from the defogger, and in the vicinity of the center in the horizontal direction, and the DTV antenna is arranged on the end part side in the horizontal direction. This makes it possible to ensure the broadcast wave reception performance of both AM and DTV antennas.

Figure 14:
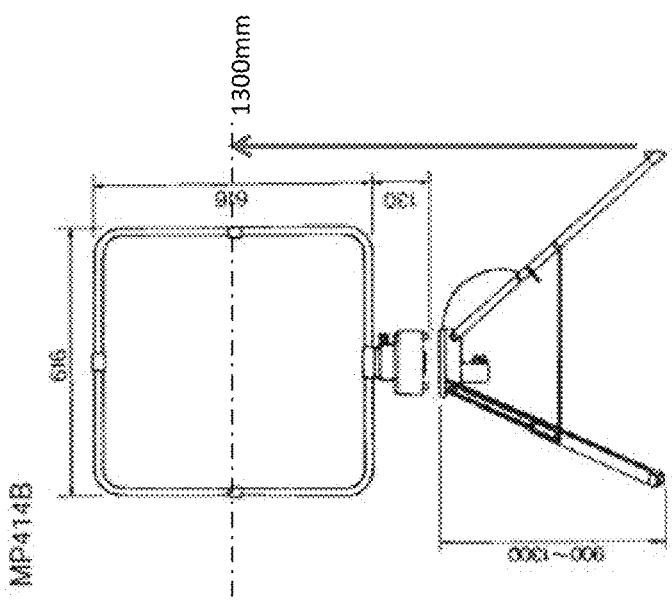
FIG. 14 is a schematic diagram of a loop antenna.

4. Consideration on Relationship Between Reception Sensitivity of AM Antenna and Capacity of Amplifier Reception levels of three types of amplifiers having different dummy capacitances (the capacitances thereof were 5 pF, 30 pF, and 50 pF) were measured with the use of the rear glasses according to working examples, and the reception levels were normalized based on the reception level obtained when the amplifier having a capacitance of 50 pF was used. More specifically, reception sensitivities were measured at seven frequencies of 594, 693, 810, 954, 1134, 1242, and 1458 kHz of the AM broadcast waves at a frequency of 530 to 1710 kHz. Also, with regard to each frequency, reception sensitivity was measured at four points on the AM antenna measurement site shown in FIG. 7. A value obtained by averaging the values measured at the four points was regarded as reception sensitivity at each frequency. Also, with regard to the reception sensitivity at each frequency, electric field levels were measured with the use of an approximately 600 mm-square loop antenna (see FIG. 14) that extended upright at a height of about 1.3 m from the ground that was equivalent to the antenna installation height, and the measured values were converted into induced voltage values in 60 dBμV/m.

Figure 15:
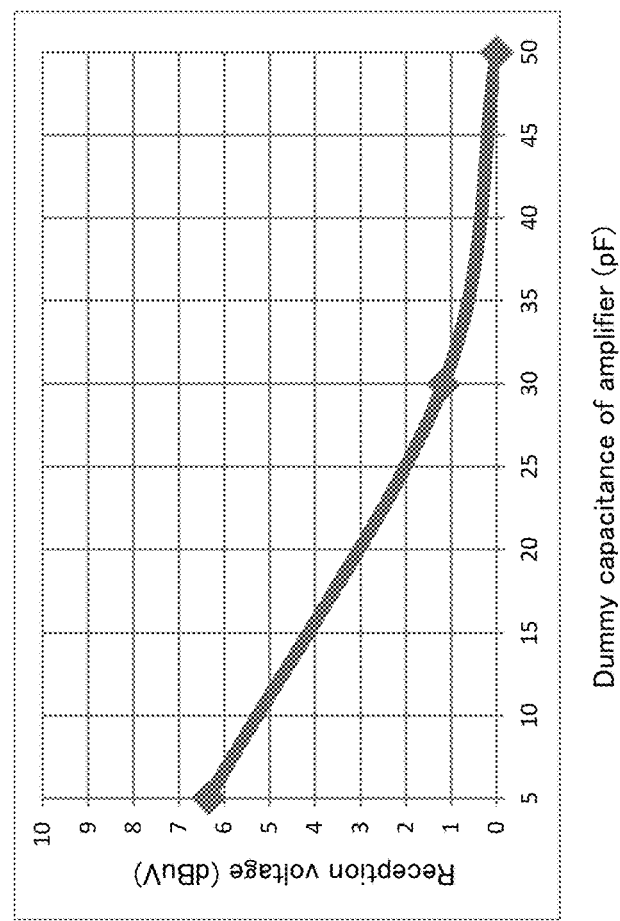
FIG. 15 is a graph showing a relationship between the capacitance of an amplifier and the reception sensitivity of an AM antenna in a working example.

The results are shown in FIG. 15. FIG. 15 shows the results obtained by measuring the broadcast wave reception voltage values of amplifier specifications having different capacities. As shown in FIG. 15, it was found that the smaller the capacity of an amplifier is, the further the reception sensitivity is improved. Thus, it was found that, even if the installation region of an AM antenna is small, the reception sensitivity thereof can be improved by reducing the capacity of an amplifier.

LIST OF REFERENCE NUMERALS

3 Rear glass
5 Defogger
6 DTV antenna
7 AM antenna

The invention claimed is:

1. A rear glass that is attachable to a resin lift-up back door in a rear of a vehicle, the rear glass comprising:
a glass plate;
a defogger that is arranged in the vicinity of a center of the glass plate in an up-down direction; and
an AM antenna that is arranged upward of the defogger on the glass plate, wherein
the AM antenna includes a power supply part and an antenna element that extends from the power supply part, and
a distance between an uppermost portion of the defogger and an upper edge of the glass plate attached to the back door is 40 to 100 mm.

2. The rear glass according to claim 1, wherein the glass plate is installed at an angle of 45 degrees or more with respect to a horizontal direction in a state in which the back door is closed.

3. The rear glass according to claim 1, wherein a distance between an upper end of the defogger and the AM antenna is less than or equal to the maximum width of the AM antenna in the up-down direction.

4. The rear glass according to claim 1, further comprising at least one additional antenna for receiving broadcast waves other than the AM broadcast waves.

5. The rear glass according to claim 4, wherein the additional antenna is arranged upward of the defogger.

6. The rear glass according to claim 4, wherein
the additional antenna includes a main antenna and a sub-antenna, and
the AM antenna is arranged between the main antenna and the sub-antenna in a horizontal direction.

7. The rear glass according to claim 4, wherein the additional antenna is an FM antenna.

8. The rear glass according to claim 4, wherein the additional antenna is a digital television antenna.

9. The rear glass according to claim 1, further comprising at least one of a digital television antenna and a DAB antenna that are arranged downward of the defogger on the glass plate.

10. The rear glass according to claim 1, wherein
an installation area of the AM antenna is 0.005 to 0.05 m$^2$, and
an amplifier that is connected to the AM antenna has a capacitance of 5 to 30 pF.

\* \* \* \* \*